(12) United States Patent
Laxminarayanan

(10) Patent No.: US 8,612,388 B2
(45) Date of Patent: Dec. 17, 2013

(54) SYSTEM AND METHOD FOR FILE MONITORING

(75) Inventor: Prasanna Laxminarayanan, San Ramon, CA (US)

(73) Assignee: Visa USA, Inc., San Francisco, CA (US)

( * ) Notice: Subject to any disclaimer, the term of this patent is extended or adjusted under 35 U.S.C. 154(b) by 625 days.

(21) Appl. No.: 12/571,040

(22) Filed: Sep. 30, 2009

(65) Prior Publication Data

US 2010/0083057 A1 Apr. 1, 2010

Related U.S. Application Data

(60) Provisional application No. 61/101,660, filed on Sep. 30, 2008.

(51) Int. Cl.
*G06F 7/00* (2006.01)

(52) U.S. Cl.
USPC ............ 707/625; 707/634; 705/301; 705/303

(58) Field of Classification Search
USPC .......................... 707/625, 634; 705/301, 333
See application file for complete search history.

(56) References Cited

U.S. PATENT DOCUMENTS

2006/0206418 A1* 9/2006 Byrne et al. .................... 705/39
2007/0276750 A1* 11/2007 Stuart ............................. 705/38
2008/0255897 A1* 10/2008 Megdal et al. .................... 705/7

* cited by examiner

*Primary Examiner* — Amy Ng
(74) *Attorney, Agent, or Firm* — Loeb & Loeb LLP

(57) ABSTRACT

A file monitoring system tracks progress of data processing of a data file. Various applications and systems transmit status updates at one or more stages of processing to the file monitoring system. The file monitoring system monitors the status updates and generates reports displaying the status of the date file at the predetermined processing states. Reports include end to end status, files received and files delivered.

14 Claims, 11 Drawing Sheets

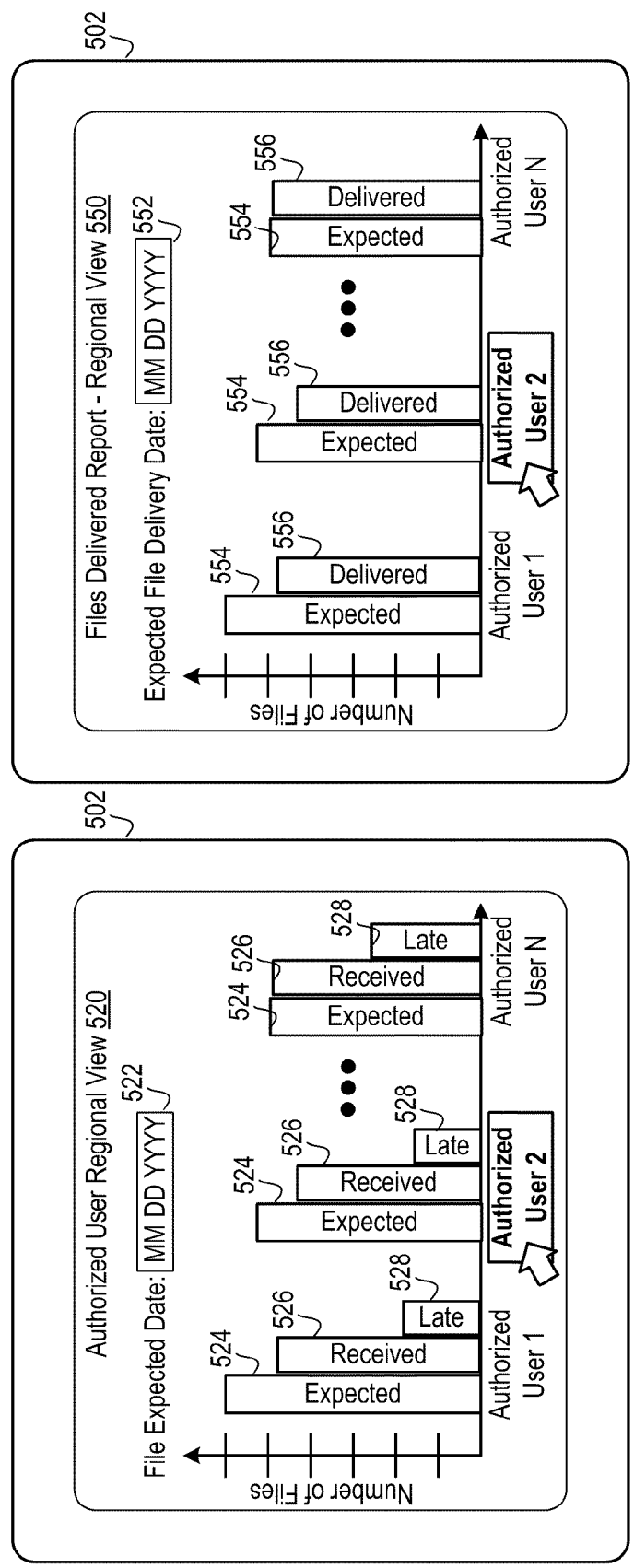

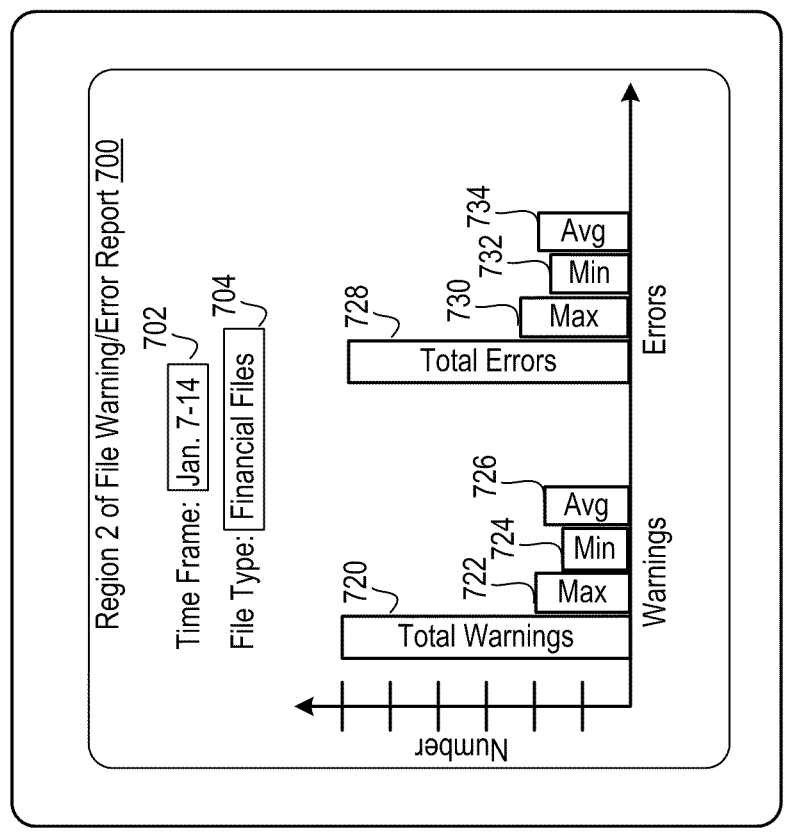

SYSTEM AND METHOD FOR FILE MONITORING

CROSS-REFERENCE TO RELATED PATENTS

The present U.S. Utility patent application claims priority pursuant to 35 U.S.C. §119(e) to U.S. Provisional Application Ser. No. 61/101,660 entitled "System and Method for Data File Monitoring," filed Sep. 30, 2008, pending, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical field of the Invention

This invention relates generally to a system and method for data processing and more particularly to a system and method for tracking status of files in a data processing system.

2. Description of Related Art

In a data processing system, data files are received and processed and an output is generated. The status of the files or data generated from the files during processing is either unknown or must be manually tracked. Therefore, a need exists for an improved system that is able to monitor status of files in a data processing system.

BRIEF DESCRIPTION OF THE SEVERAL VIEWS OF THE DRAWINGS

FIGS. 7a and 7b and 7c are schematic block diagrams of an embodiment of a graphical user interface for displaying a status report of expected and received data files;

FIG. 8 is a schematic block diagram of an embodiment of a graphical user interface for displaying a file delivered status report;

FIGS. 12a and 12b are schematic block diagrams of an embodiment of a graphical user interface for displaying a file processing warning and error statistics report.

DETAILED DESCRIPTION OF EMBODIMENTS OF THE INVENTION

Figure 1:
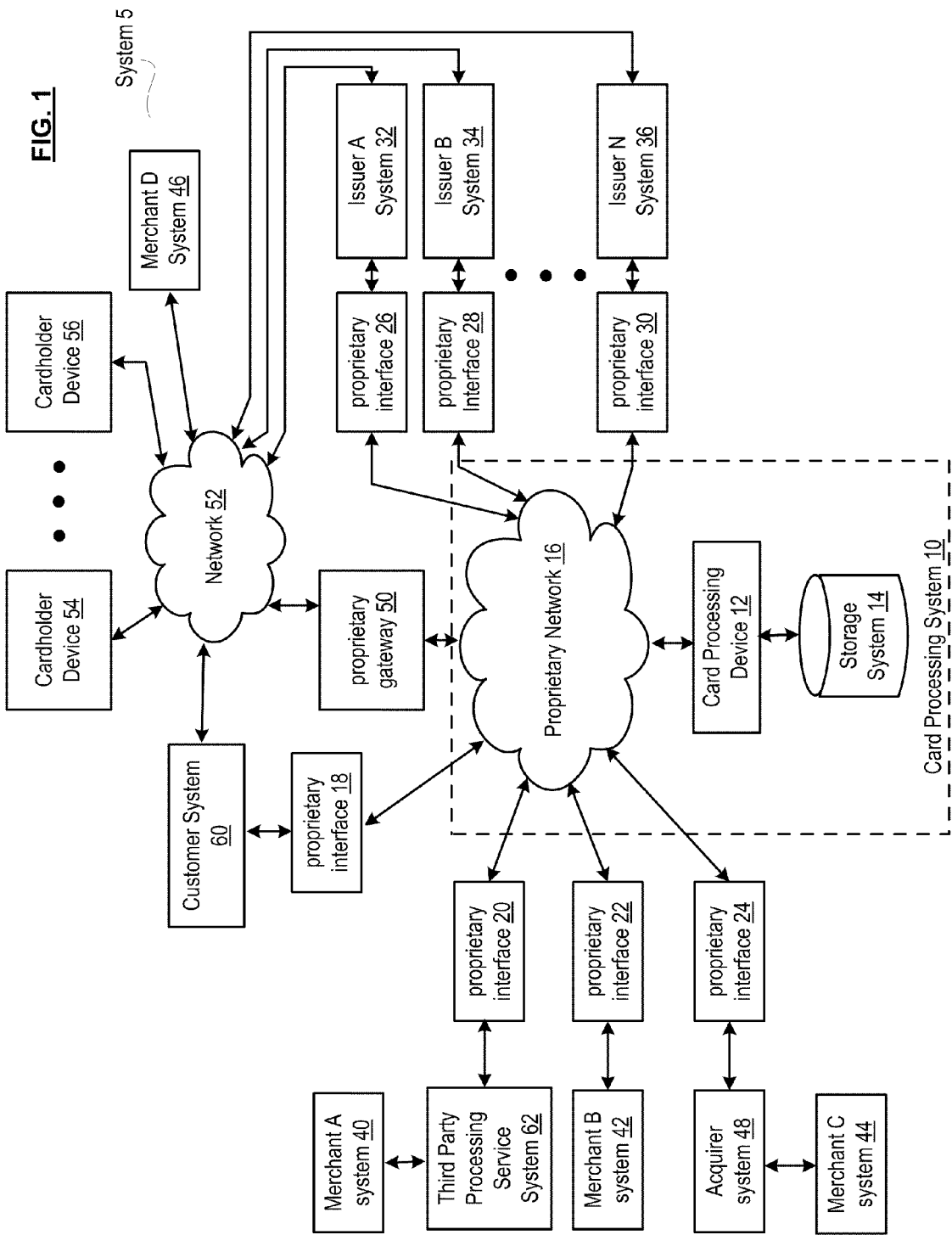
FIG. 1 is a schematic block diagram of an embodiment of a card processing system in accordance with the present invention.

FIG. 1 is a schematic block diagram of an embodiment of a system 5 that includes a card processing system 10, a plurality of proprietary interfaces 18-30, a plurality of issuer systems 32-36, a plurality of merchant systems 40-46, one or more acquirer systems 48, one or more third party processing service systems 62, a proprietary gateway 50, a wide area network 52, and a plurality of cardholder devices 54-56. The merchant systems 40-46 are point of sale devices associated with a merchant that sells products and/or services. Such a merchant may have a single location or multiple national or international locations. The merchant may have an online internet store. The issuer systems 32-36 are each associated with a different issuer. An issuer is a bank, financial institution or other entity that issues a credit or debit card to commercial entities or consumers. The proprietary interfaces 18-30 provide network access. The network interfaces 18-30 may include gateways, proxy servers, modems, network terminals and other devices that are operable to provide communication to the proprietary network 16.

The card processing system 10 includes a card processing device 12, a storage system 14 and a proprietary network 16. The card processing device 12 includes one or more computing devices (e.g., computers, servers, super computers, main frames, etc.) coupled to the proprietary network 16. The proprietary network 16 and card processing device 12 have a storage system 14 coupled thereto. The storage system 14 may be one or more databases implemented in internal memory devices, storage area networks, network attached storage devices, or other storage devices located in one geographical location or multiple geographical locations. The storage system 14 may be structured as relational, network, hierarchal or object based or other type of structured database operable to store and locate data files.

The card processing device 12, the storage system 14, and the proprietary network 16 may be operated and maintained by a single transactional processing entity. For example, Visa, Inc. may provide its VisaNet® or Interlink® or Visa/Plus® ATM Network or combination thereof as the proprietary network 16. In another embodiment, the card processing system 12, the storage system 14 and the proprietary network 16 are owned and operated by different legal entities.

The network 52 provides access to the proprietary network 16 through the proprietary gateway 50. The network 52 may be a wide area network, such as the internet, or an access network or a proprietary network that connects devices to the proprietary network 16 through the proprietary gateway 50. The proprietary gateway 50 includes one or more edge network nodes that control access to the proprietary network 16 and may also provide firewall and routing services to the proprietary network 16 to ensure only authorized communications are transmitted in the proprietary network 16.

In operation, the card processing system 10 receives an authorization request for a transaction from an acquirer system 48 or merchant system 40-46 or third party processing service system 62. In general, the authorization request is initiated when a merchant system 40-46 receives card information and obtains a transaction amount. The merchant system 40-46 transmits the card information and the transaction amount to an acquirer system 48 or third party processing service system 62 which combines the card information and the transaction amount into an authorization request. The acquirer system 48 then transmits the authorization request to the card processing system 10. The card processing system 10 routes the authorization request to one of a plurality of issuer systems 32-36. The issuer system 32-36 approves or denies the transaction in an authorization response transmitted to the card processing system 10. The card processing system 10 then forwards the authorization response from the issuer system 32-36 to the acquirer system 48 or merchant system 40-46 or through the third party processing service system 62 to merchant system 40-46. In another embodiment, the card processing system 10 may perform a stand-in review and authorization for the issuer system 32-36.

The card processing system 10 also performs clearing and settlement services. An acquirer system 48 formats transaction data into a settlement request and transmits it to the card processing system 10. The card processing network 10 receives the settlement request and processes the settlement request to calculate settlement obligations of the issuer, processing fees, and amount due the acquirer system. The card processing network 10 then transmits the settlement request to the issuer system 32-36. The issuer system 32-36 transmits settlement data to the card processing network 10 and transfers settlement funds to a designated account of the card processing system 10. The issuer processes the transaction data and associates each transaction with a customer's account for payment. The issuer system 32-36 also generates account statements which summarize the transactions and transaction data for a period of the customer's account. The card processing system 10 processes the settlement data and transfers the settlement funds to the acquirer system 48. In addition, the card processing network 10 may assist in processing disputes over transactions or transaction data with dispute resolution procedures. For example, a customer may dispute a transaction amount or assert that a transaction was committed fraudulently without authorization. The card processing system 10 may then initiate an investigation and a chargeback or reversal of financial liability of a particular transaction by the issuer system 32-36 to an acquirer system 48.

The card processing system 10 may also provide services to one or more customer systems 60. The customer includes, for example, a corporation, company, small business or government entity. The card processing system 10 provides various services to customer system 60, such as accounting services, corporate card services (through one or more issuer systems 32-36), 1099 services, etc.

Figure 2:
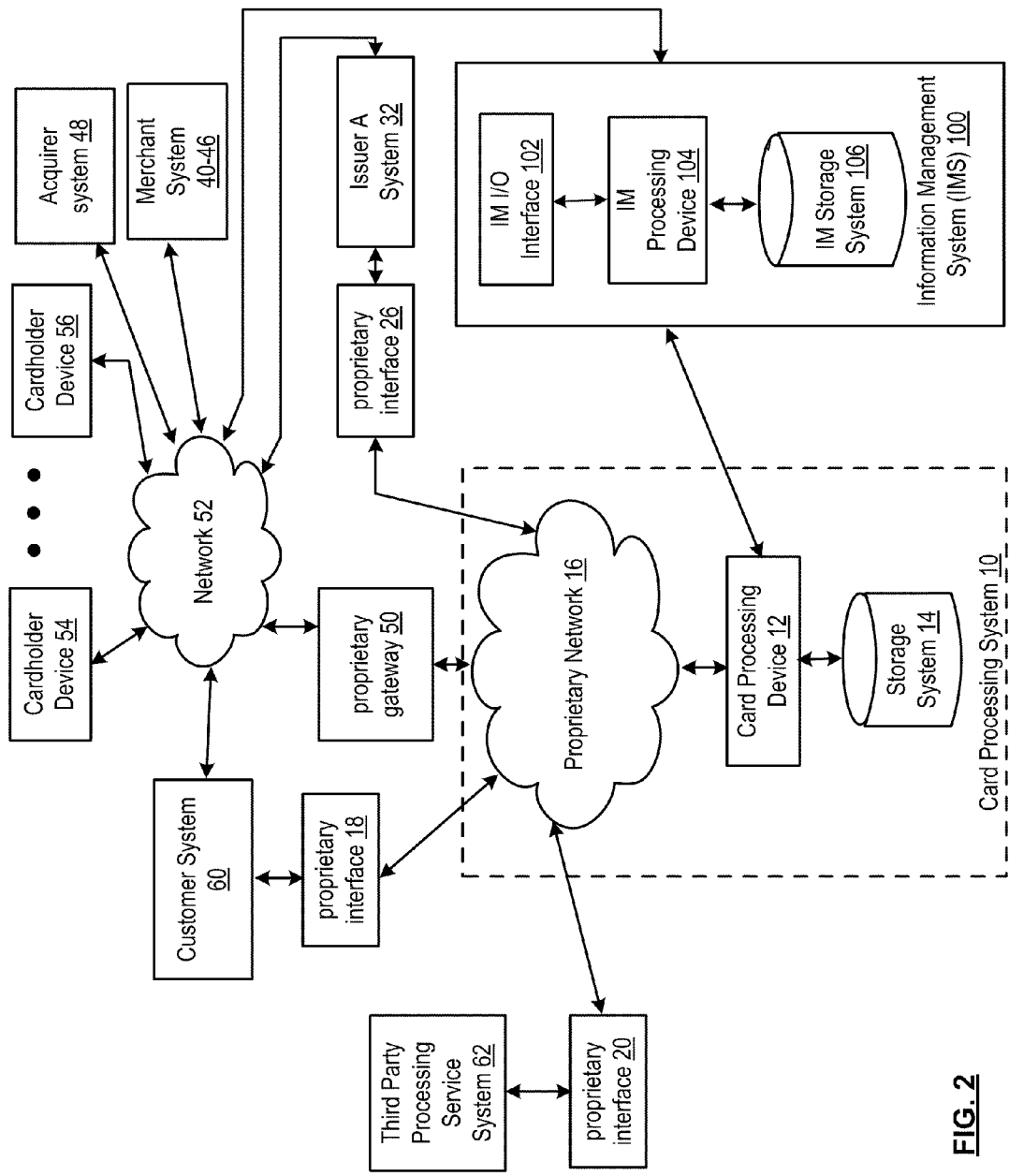
FIG. 2 is a schematic block diagram of an embodiment of an information management system in accordance with the present invention.

FIG. 2 illustrates an embodiment of an information management system (IMS) 100. The IMS 100 is coupled to the card processing system 10, proprietary network 16 and network 52. The IMS 100 includes an IM processing device 104, IM input/output (I/O) system 102, and IM storage system 106. The IM I/O system 102 provides access to the IMS 100. Customer systems 60, acquirer systems 48, third party processing service systems 62 and acquirer systems 48 access the IM I/O system 102 through network 52 or through proprietary network 16. The IM I/O system 102 includes one or more servers for receiving and transmitting data files, such as a file server, web server, etc. Third party systems, such as customer system 60, acquirer system 48 and merchant system 40-46, are able to access the IMS 100 through the IM I/O system 102 to transmit data files or download data files using FTP or other secure file transfer protocol. The IM I/O system 102 may include a web server that provides a web portal for displaying certain websites, site content, GUIs, html documents, using an HTTP protocol or other similar protocol. The IM storage system 106 stores commercial transaction data as a commercial center data repository. The IM storage system 106 may be a separate storage system or be included within storage system 14.

The IM Processing Device 104 includes one or more of servers, computers or other processing modules. In an embodiment, the processing module includes a central processing unit; a memory that includes system memory, cache memory, and read only memory; an I/O module that includes a graphical user interface and/or a peripheral device interface (e.g., to connect to a mouse, a keyboard, etc.) and a video card, printer card, etc. In general, the processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have internal memory and/or is coupled to memory. Memory and internal memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or memory stores, and the processing module is operable to execute, hard coded and/or operational instructions corresponding to steps and/or functions described herein.

The IMS 100 and card processing system 10 receive various types of data files from third party systems, such as issuer systems, acquirer systems, commercial customer systems, etc. The data files, for example, may be data files with new card account information from issuer systems, new merchant profiles from acquirer systems, account payable files from a commercial customer system, etc. The data files may include text, records, images, video, or other multimedia content. The data files may be formatted as excel spreadsheets, documents, ASCII, HTML or other formats.

The card processing system 10 and IMS 100 are operable to receive a data file, process the data file and generate an output. The output may be updating a card account, creating a new card account, storing data in a database, generating a report, generating an updated data file, etc. The number of systems and applications that receive and process data generated from the file may vary depending on the type of file and service provided. As such, it is difficult to track the status of a data file and its stage of processing by applications in the IMS 100 and card processing system 10.

Figure 3:
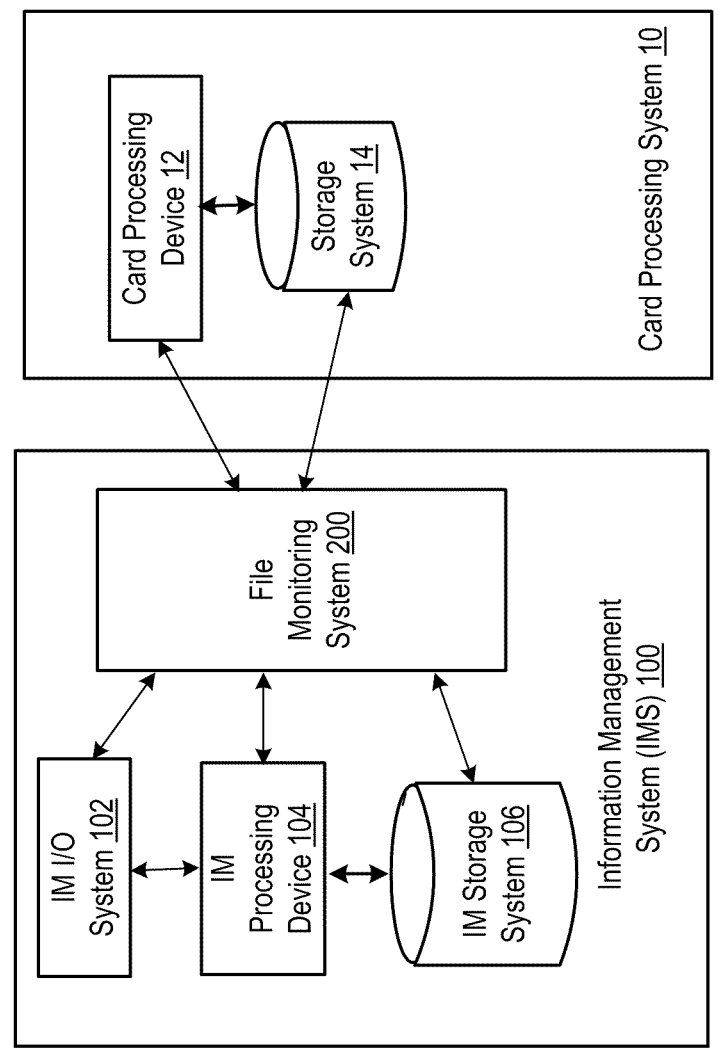
FIG. 3 is a schematic block diagram of an embodiment of a file monitoring system in accordance with the present invention.

FIG. 3 illustrates an embodiment of a data file monitoring system 200. The data file monitoring system 200 is coupled to the IMS 100 and the card processing system 10. The data file monitoring system 200 may be a separate system or may be incorporated into the IMS 100. In an embodiment, data file monitoring system 200 tracks progress of data files through various processing stages in the IMS 100 and card processing system 10. When a data file is received, the data file monitoring system 200 receives a file tracking number associated with the data file and determines from the tracking number whether the data file is expected from an authorized user. The file monitoring system 200 then determines an expected number of files from an authorized user and number of received files from the authorized user. The file monitoring system 200 generates reports that may be accessed via a web portal or that can be transmitted to an authorized user. The reports notify the authorized users when expected files have not been received within a predetermined time period. Once the data file is received from an authorized user, the file monitoring system 200 receives status updates on processing of data generated from the file at predetermined stages of processing from applications and systems in the IMS 100 and card processing system 10 or other systems and networks. The file monitoring system also receives a status update at completion of processing and when a file is delivered to an authorized user. The file tracking number is thus used to determine the location of the data file in the IMS 100 and card processing system 10 and other coupled systems. Based on the file location, the particular status of the file may be determined. In addition, the status updates may include additional status information. The data file monitoring system 200 is thus able to track the progress of the data file and data generated from the data file and any resulting output through receipt, processing and completion.

Figure 4:
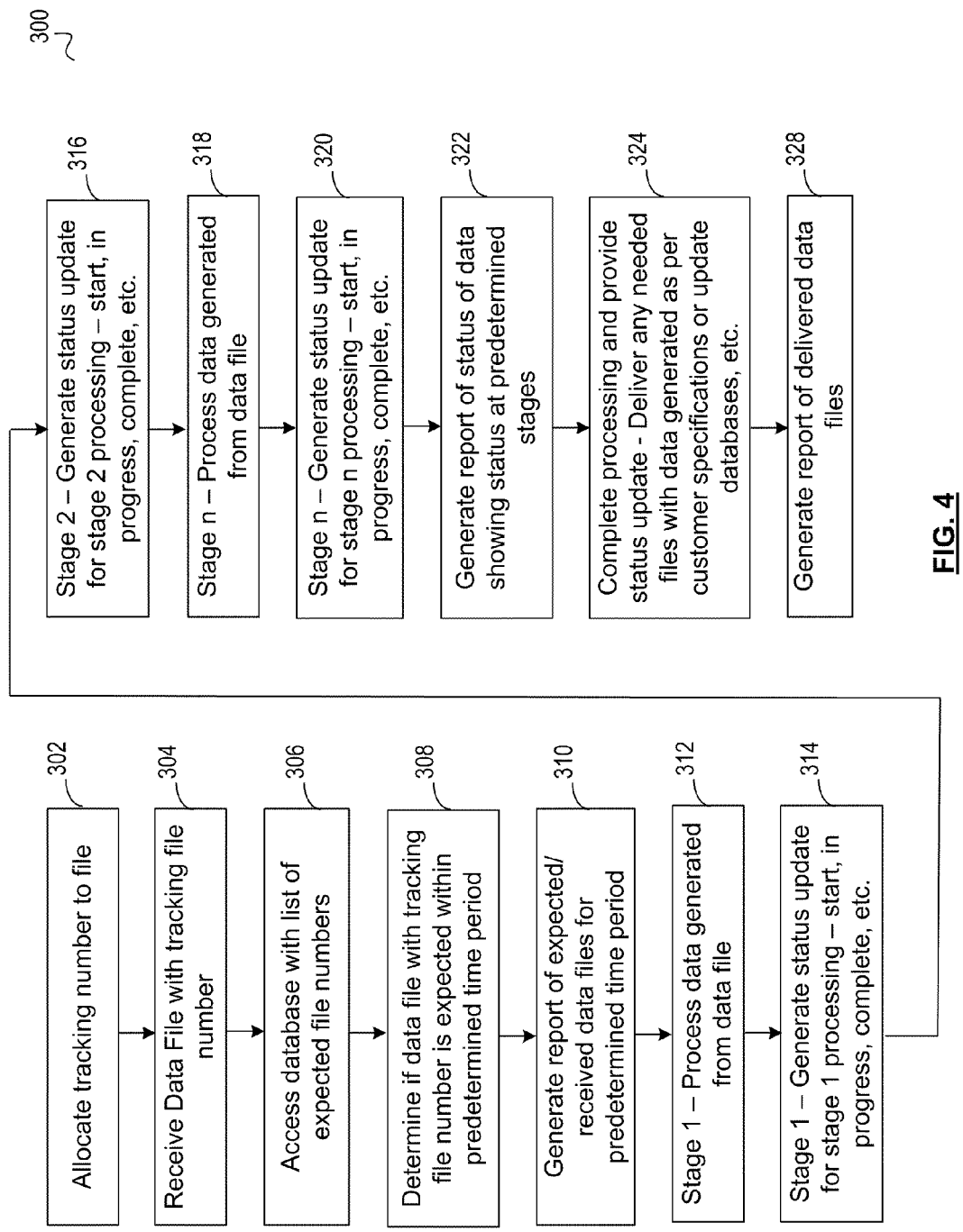
FIG. 4 is a logic diagram of an embodiment of a method for tracking progress of a data file in accordance with the present invention.

FIG. 4 and illustrates an embodiment of a method 300 for tracking the progress of a data file by data file monitoring system 200. A data file is provided a file tracking number in step 302. In an embodiment, a predetermined format for the tracking number is established between the file monitoring system 200 and an authorized user. The predetermined format includes a first series of characters, either numbers, letters, or symbols, that identify the authorized user. The file tracking number also includes a second series of characters that identify a type of file. In an embodiment, the file tracking number includes a third series of characters that are unique to the file. The unique number may be randomly generated, sequentially generated, or derived from the file. In another embodiment, the file monitoring system 200 assigns a tracking number to the file upon receipt from an authorized user and notifies the authorized user of the tracking number.

When the file is received, either by IM system 100 or card processing system 10, a status update is generated and transmitted to the file monitoring system 200 in step 304. The status update includes the file tracking number for the file. In an embodiment, the system receiving the file generates a time stamp with a date and time of receipt of the file. The status update also includes a timestamp with the data and time of receipt of the file.

The file monitoring system 200 receives the status update with the file tracking number and timestamp. It accesses a database with a listing of authorized users and corresponding type of files expected from the authorized users in step 306. The database also includes a time frame in which each type of file is expected. For example, a new account file may be expected daily from an issuing bank system or a merchant information update file expected weekly from an acquirer system. The file monitoring system 200 determines from the file tracking number and timestamp for the file whether it is a type of file expected from the authorized user within a predetermined time frame in step 308. The file monitoring system 200 generates a files expected and received report listing the expected types of files within a predetermined time frame and the received reports within the predetermined time frame. The files expected and received report thus allows the file monitoring system 200 and an authorized user to determine whether a type of file has been received. In addition, the report will list any unexpected types of files received from an authorized user.

The data from the file is processed in step 312. Depending on the type of file, there are different processing stages and number of stages. In addition, each processing stage may be performed by one or more applications and systems. The file monitoring system 200 receives a status updates for processing stage 1 from the application/system processing the file in step 314. In step 316, data generated from the file is processed by another processing stage. The file monitoring system 200 receives one or more status updates for this next stage of processing in step 318. The status updates identify the stage of processing and status information. The status information includes application/system processing the file, receipt of data for processing, processing in progress, completion of processing and errors generated in processing. The data is processed in n processing stage in step 320, and the file monitoring system 200 receives a status updates in step 322.

The file monitoring system 200 generates reports showing the progress of the data processing in step 324. The reports show the status at predetermined stages of processing. The reports may be updated periodically or updated at receipt of each status update. In step 326, the processing is completed and any required output transmitted to the authorized user. The output may be an updated file, creation of accounts, storing updated information, etc. In step 328, the file monitoring system 200 tracks the transmission of data files to an authorized user and creates a report of transmitted data files.

Figure 5:
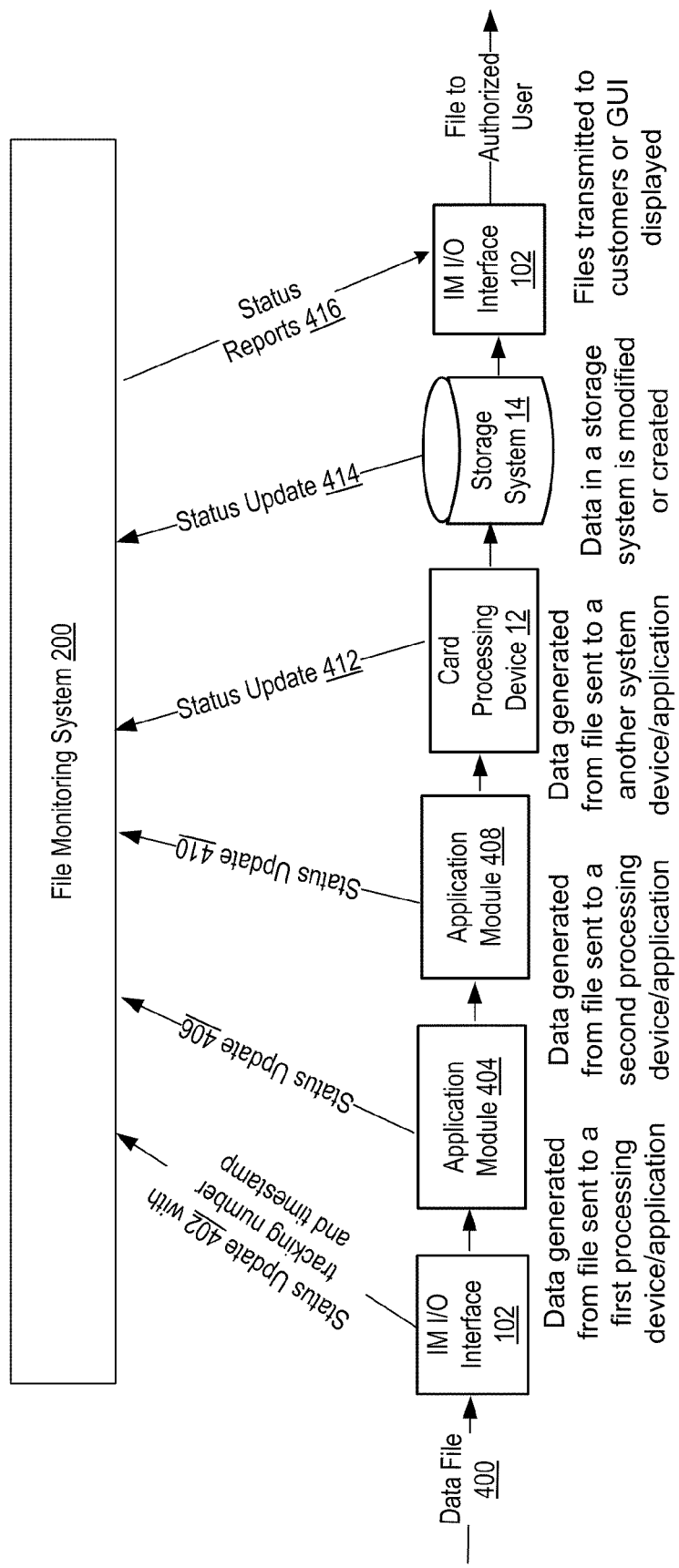
FIG. 5 is a schematic block diagram of an embodiment of a system for file monitoring in accordance with the present invention.

FIG. 5 illustrates an embodiment of a system for tracking the progress of file processing by the file monitoring system 200. In an embodiment, a data file 400 with a file tracking number is received by IM I/O interface 102. The IM I/O interface 102 transmits a status update 402 to the file monitoring system 200. The status update includes a file tracking number and timestamp with date and time of receipt of a file. The IM I/O interface 102 transmits data from the file or the file to a first application 404 at IM Processing Device 104. The first application 404 transmits one or more status updates 406 to file monitoring system 200. The data generated by the first application 404 is transmitted to a second application 408 at IM Processing Device 104. The second application 408 transmits one or more status updates 410 to file monitoring system 200. The data generated from the second application 408 is then transmitted to another system card processing device 12. Card processing device 12 transmits one or more status updates 412 to file monitoring system 200. The card processing device 12 transmits data to storage system 14 to update or create a data entry in one or more files. The storage system 14 transmits one or more status updates 414 to file monitoring system 200.

In one embodiment of the invention, the file monitoring system 200 provides a graphical user interface (GUI) to view status reports 416 of the processing of the data files. The GUI may be provided by a web server in the IM I/O interface 102 or other server, as a web based application to authorized users. In another embodiment, the file monitoring system 200 may provide status reports 416 in various file formats, such as excel, ASCII, Adobe Acrobat pdf, etc., to the IM I/O interface 102. The IM I/O interface 102 then transmits the status reports to an authorized user.

Though a card processing system 12 and information management system 100 have been described herein, the file monitoring system 200 may interface with other data processing systems to track the status of data processing. Alternative or additional stages of processing may be defined to track the status of processing in other data processing systems.

Figure 6:
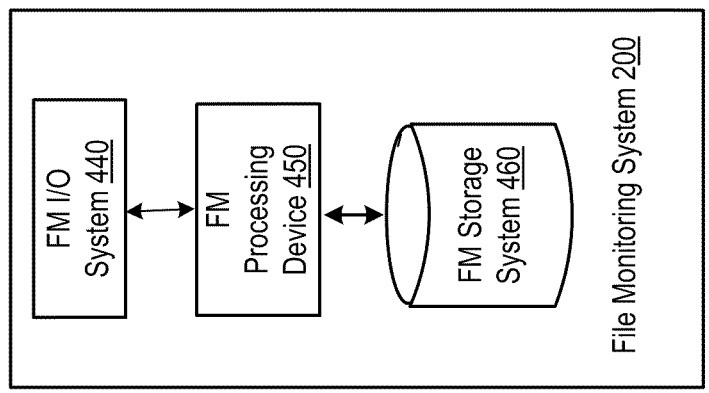
FIG. 6 is a schematic block diagram of an embodiment of a file monitoring system in accordance with the present invention.

FIG. 6 illustrates a schematic block diagram of an embodiment of the file monitoring system 200. The file monitoring system 200 includes FM input/output (I/O) system 440, FM processing device 450 and FM storage system 460. The FM I/O system 440 provides access to the information management system 100 and card processing system 10. In an embodiment, the FM I/O system 440 also provides access to customer system 60, acquirer system 48, merchant system 40-46 and other external systems through network 52 or through proprietary network 16. In this embodiment, the customer system 60, acquirer system 48 and merchant system 40-46 are able to access status reports from the file monitoring system 200 through the FM I/O system 440, rather than the IM I/O system 102, using FTP or other secure file transfer protocol. In an embodiment, the IM I/O interface 102 or FM I/O system 440 include a web server that provides a web portal for displaying status reports in one or more graphical user interfaces (GUIs) to authorized users. The authorized users include operators of the IMS 100 and card processing system 10 to monitor operations. The authorized users also include third party systems, including operators of acquirer system 48, issuer systems 32-36, customer systems 60 and third party processing service system 62. The file monitoring system 200 limits access of third party authorized users to only data and reports for files from such third party authorized users.

The FM storage system 460 stores status update information and status report data. The FM storage system 460 may be a separate storage system or be included within storage system 14 or IM storage system 106.

The FM Processing Device 450 includes one or more servers, computers or processing modules. In an embodiment, the processing module includes a central processing unit; a memory that includes system memory, cache memory, and read only memory; an I/O module that includes a graphical user interface and/or a peripheral device interface (e.g., to connect to a mouse, a keyboard, etc.) and a video card, printer card, etc. In general, the processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have internal memory and/or is coupled to memory. Memory and internal memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or memory stores, and the processing module is operable to execute, hard coded and/or operational instructions corresponding to steps and/or functions described herein.

In an embodiment, the file monitoring system 200 provides a files expected and received status report. This status report provides a description of files expected and actual files received. The report may include files received by one or more systems and applications in one or more regions. In an embodiment, the report summarizes and displays files expected and received at a regional level and for each defined frequency or predetermined time frame for receiving the file.

Figure 7B:
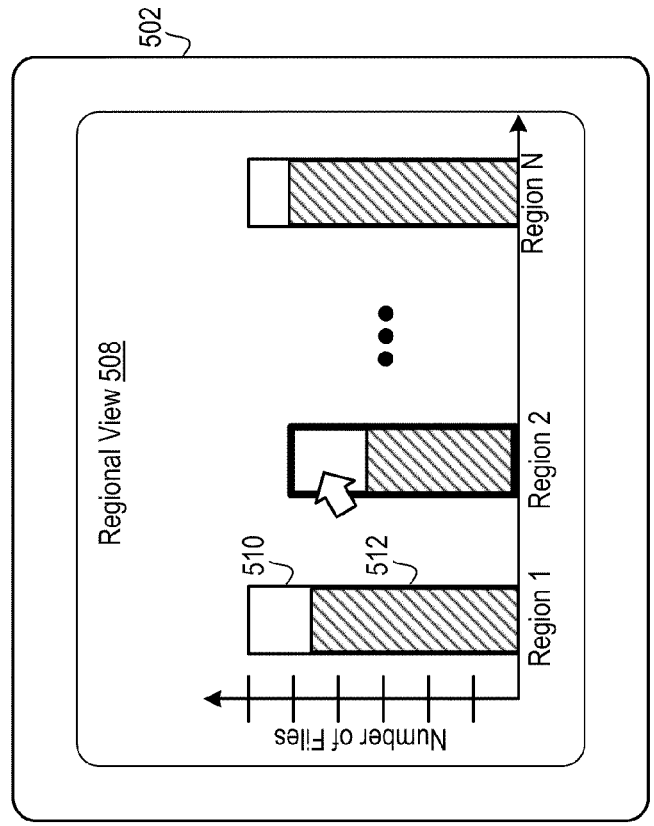
Figure 7A:
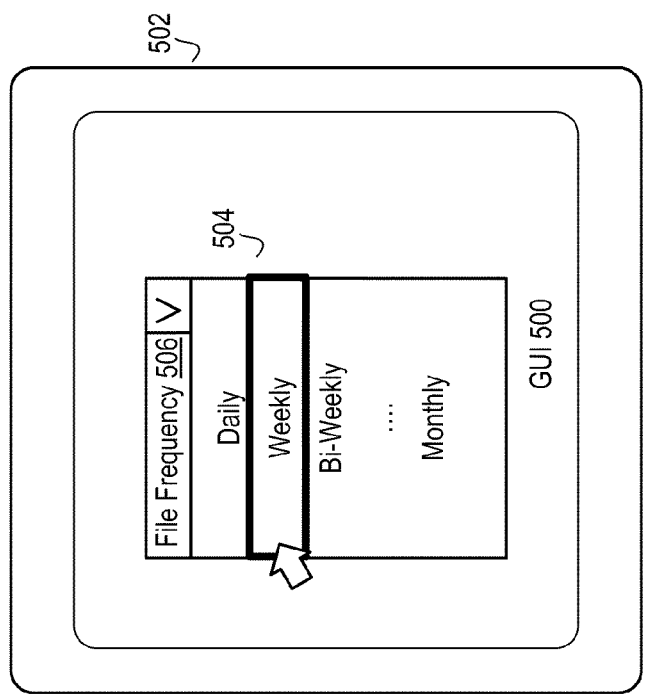

FIGS. 7a-c are schematic block diagrams of an embodiment of a graphical user interface (GUI) 500 of a files expected and received status report 504 on a display 502. The display 502 is associated with any type of electronic device including a personal computer, a laptop, a wireless phone, a personal digital assistant or other device operable to communicate with file monitoring system 200. The GUI 500 of the files expected and received status report 504 includes various levels of dimension. In an embodiment, the levels of dimension include: File Frequency (Daily, Weekly, Monthly, etc.), Time (Month, Week, Day, etc.), Region, Processing application, Authorized User, Outbound File Definition, and Customer. From each dimension, a next level of dimension can be selected for viewing.

FIG. 7a illustrates a file frequency 506 dimension level to the files expected and received status report 504. When a file frequency 506 is selected, a regional view 508 displays a number of files expected 510 and number of files received 512 for each region. Though a bar graph is illustrated in FIG. 7b, other types of graphs or data formatting may be implemented with different or additional information.

When a region is selected in the regional view 508, information for authorized users in the selected region is displayed, as illustrated in FIG. 7c. In an embodiment, the following information is displayed: File Expected Date 522, Number of Files Expected 524 (e.g., up to the time of creating report), Number of Files Received 526 (e.g., actual up to the time of creating report), Number of files received late 528.

When an authorized user is selected, the graphical user interface 500 displays individual file definitions expected from the selected authorized user. At the File definition level, one or more of the following fields are displayed for each file of the authorized user:

File definition name
Format Mask
Expected timestamp (display in YYYY-MM-DD HH:MM; SS)
Expected to receive "empty" file if no data (Yes/No)
Actual timestamp (when the file is received)
Actual file name (when the file is received)
Current Processing Status (list of status values as used by the application)
Minimum Posting Date Received in file (e.g., for financial files)
Maximum Posting Date Received in file (e.g., financial files only)
Minimum transaction date received in file (e.g., for invoice files)
Maximum transaction date received in file (e.g., invoice files only)
Number of financial transactions/total records
Commercial sales volume CSV The fields may be displayed in a spreadsheet format or other type of format. Other or additional fields, dimension levels or order of dimension levels may be implemented by the file monitoring system 200 for the files expected and received status report 504.

In an embodiment, the file monitoring system 200 displays a status indicator, such as Red, Green and Yellow, to display an overall file status for a region and authorized user. For example, a green status indicates an expected file count and a received file count are equal. A red status indicates that an expected file count is greater than the received file count and at least one of the files has not been received even after a tolerance limit. The tolerance limit is different for different types of files (e.g., for daily files tolerance is 0 hours, for weekly files tolerance is 1 business day and for monthly files tolerance is 5 business days). Tolerance limits are a configurable parameter. Yellow status indicates that an expected file count is less than a received file count or that an expected count is greater than the received count, but all the files are within tolerance limit. Additional or other types of status indicators may be implemented. When a file is not received on the expected date, but has since been received, statistics for the expected date are updated to "Number of files actually received" count to account for this file and status is updated accordingly (e.g., when a status is red, the file monitoring system 200 will change the status to green when there are no other problems). Though color indicators are described, other type of status indicators, such as icons, may be implemented in lieu of or in addition to the color indicators.

In an embodiment, a summary notification is generated periodically, for example, at the end of the day or at the end of the week. The summary notification includes a status of files expected to be received for that time period and files still in error from previous time periods. The summary notification is displayed as part of the files expected and received status report 504 in a graphical user interface of a web portal or transmitted to an authorized user system as an email or text message.

In an embodiment, the file monitoring system 200 generates a files delivered status report. The files delivered status report displays a total number of outbound files expected to be delivered and actual files delivered. The actual files delivered include files delivered from various regions and from different processing applications. The files delivered include one or more: files delivered to external third party systems, file transfer delivery, flow through delivery, and files delivered to other internal applications, such as IMS applications 100 or card processing system 10 applications. For example, in an embodiment, files delivered include file transfers to applications for reporting 1099information or socio economic applications.

The total files expected and delivered are summarized and displayed at a regional level and for each defined file frequency. In an embodiment, the levels of dimension include: File Frequency (Daily, Weekly, Monthly), Time (Month, Week, Day), Region, Processing application, Authorized User (such as member bank), Outbound File Definition, and Customer (e.g., corporate customer name). From each dimension, a next level of dimension listed above can be selected. Alternative and additional views and dimensions may be implemented as well.

FIG. 8 illustrates a regional view of a file delivered status report 550. When a region of the regional summary level GUI is selected, the GUI 500 displays an expected and delivered file status for each authorized user within that region. The following information is shown: Expected File Delivery Date 552, Number of Files Expected to be Delivered 554 and actual Number of Files Delivered 556. Though a bar graph is illustrated in FIG. 8, other types of graphs or data formatting may be implemented with different or additional information.

When an authorized user is selected, the graphical user interface 500 displays a file definition level. At the file definition level, one or more of the following fields are displayed for each file:
File definition name
Format Mask
Expected timestamp (display in YYYY-MM-DD HH:MM;SS)
Expected to deliver "empty" file if no data (Yes/No)
Actual timestamp (when the file is delivered)
Actual file name (when the file is delivered)
Current Processing Status (list of status values as used by the application)
Number of records in file The fields may be displayed in a spreadsheet format or other type of format. Alternative and additional fields, dimension levels or order of dimension levels may be implemented by the file monitoring system 200 for the file delivered status report 550.

In an embodiment, the file monitoring system 200 displays a status indicator, such as Red, Green and Yellow, to display an overall file status for a region and authorized user. For example, a green status indicates that the expected and the delivered counts are equal. A red status indicates that the expected count is greater than the delivered counts and at least one of the files has not been delivered even after tolerance limit. This tolerance limit is different for different types of files (e.g., for daily files tolerance is 2 hours, for weekly files tolerance is 1 business day and for monthly files tolerance is 5 business days). Tolerance limits are a configurable parameter. A yellow status indicates that the expected file count is less than the delivered file counts or that the expected file count is greater than the delivered count, but all the files are within tolerance limit.

In an embodiment, the file monitoring system 200 generates an end to end status view report. This report displays the end to end status for files received, e.g. by the card processing system 10 and IMS 100. In an embodiment, the end to end status report includes one or more dimension levels including: File Frequency (Daily, Weekly, Monthly), Time (Month, Week, Day), Region, Application/Processor, Authorized User, File Definition, Customer. From each dimension, a next level of dimension listed above can be selected. Alternative and additional views and dimensions may be implemented as well.

A file frequency (Daily, Weekly, Monthly) is selected, and then a regional summary view displays one or more regions and number of files being processed for the regions for a selected time (Month, Week, Day). When a region is selected in the regional summary view, the application displays a number of files being processed for each authorized user within the selected region. In another embodiment, when a region is selected in the regional summary view, depending on the processing platform, the application displays processing application and then authorized users for each processing application. In addition, when a file contains data for more than one authorized user, the application will display processing application when a region is selected. File definition information is displayed for each authorized user or by processing application for each authorized user.

Figure 9A:
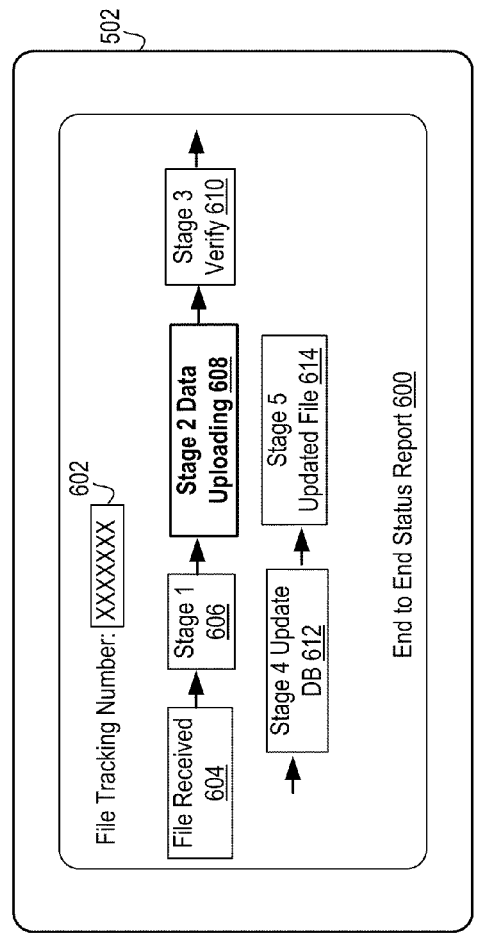
FIGS. 9a and 9b are schematic block diagrams of an embodiment of a graphical user interface for displaying an end to end status report for a data file.
Figure 9B:
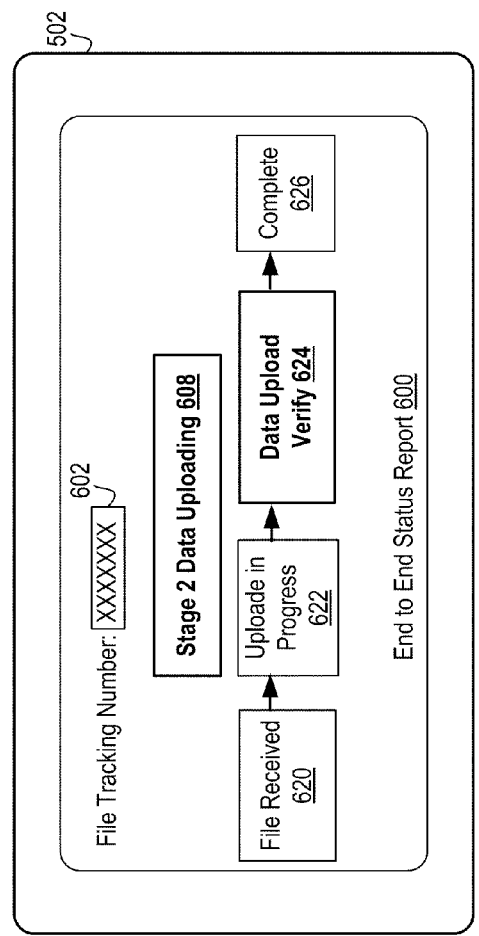

The processing stages of a file are different based on the application and system processing the file. As such, both the predetermined processing stages for the file and current status of the file are displayed. A tabular or graphical view may be used to display the processing stages. FIG. 9a illustrates an embodiment of an end to end status report 600 for a selected file. FIG. 9a illustrates predetermined stages of processing for the selected file. In an embodiment, the current stage of processing for the selected file is highlighted, e.g. in the example of FIG. 9a, stage 2 data uploading 608 is indicated as the current stage of processing for the data file. In an embodiment, a processing stage is also highlighted when there are any errors or warnings during the processing. The names of the processing stages in FIG. 9 are for illustration and different number and type of processing stages are possible. In an embodiment, when a stage is selected, progress of the file in the processing stage can be further displayed. For example, FIG. 9b illustrates status of file processing in Stage 2 Data uploading 608. The start and end processing time for each processing stage can also be displayed when available. As the file monitoring system 200 receives status updates from the card processing system 10 and IMS 100, it updates the file status in the end to end status report. In another embodiment, the file monitoring system periodically updates the file status in response to received status updates. Though a block diagram of the processing stages is illustrated in FIGS. 9a and 9b, other types of graphs or data formatting may be implemented with different or additional information.

In an embodiment, file monitoring system 200 generates and provides a report on a Volume of Files Received. This report displays a total number of files received and processed through the IMS 100 or card processing system 10. In an embodiment, the Volume of Files Received report includes one or more dimension levels including: Time Frame (Month, Quarter, Year, etc.), Region, Authorized User, and File Format. From each dimension, a next level of dimension listed above can be selected. Alternative and additional views and dimensions may be implemented as well.

Figure 10B:
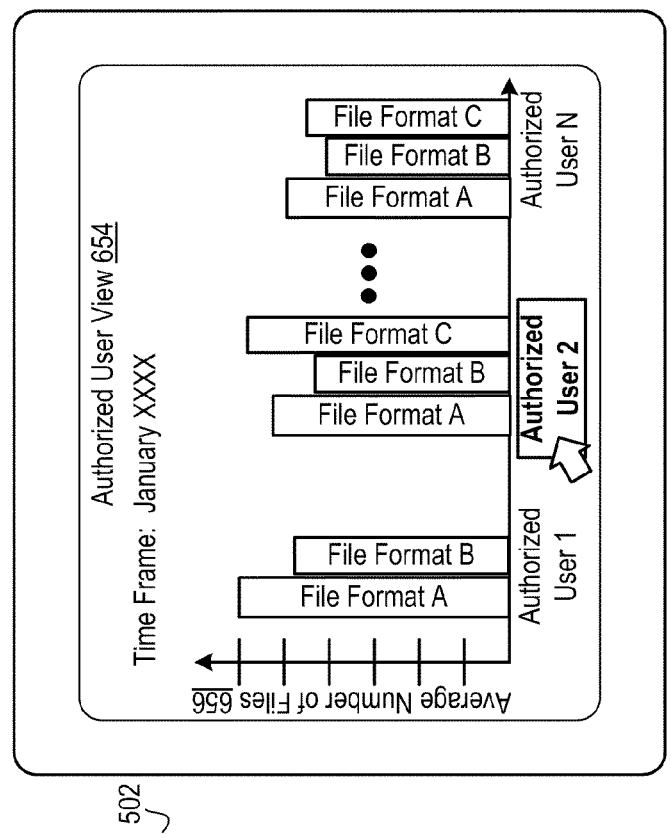
FIGS. 10a and 10b are schematic block diagrams of an embodiment of a graphical user interface for displaying a volume of files received Report.
Figure 10A:
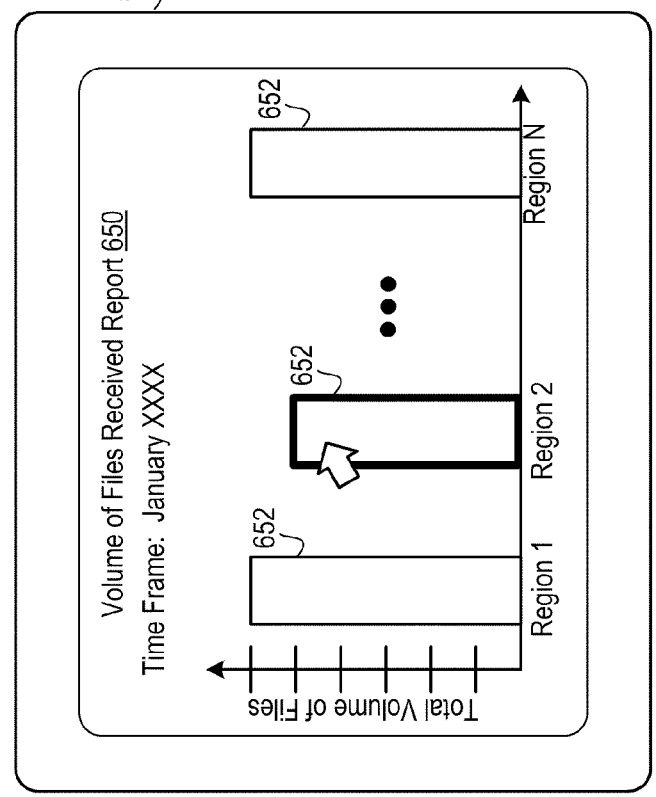

FIGS. 10a and 10b illustrate an embodiment of the Volume of Files Received Report 650. When a Time Frame is selected (Month, Quarter, Year), the report 650 in FIG. 10a displays a metric for the number of files 652 received by each region. When a region is selected, the report displays an Authorized User Regional View 654 in FIG. 10b. The Authorized User Regional View 654 includes an average number of files 656 for authorized users for one or more file formats. Additional charts can be selected to illustrate different metrics, including: Total File Count, Average File Count, Maximum File Count, Cumulative Growth %. Though a bar graph is illustrated in FIGS. 10a and 10b, other types of graphs or data formatting may be implemented with different or additional information.

In an embodiment, file monitoring system 200 generates and provides a report on Volume of Files Delivered. This report displays a total number of files received and processed through the IMS 100 or card processing system 10. In an embodiment, the Volume of Files Delivered report includes one or more dimension levels including: Time Frame (Month, Quarter, Year, etc.), Region, Authorized User and File Format. From each dimension, a next level of dimension listed above can be selected. Alternative and additional views and dimensions may be implemented as well.

When a Time Frame is selected (Month, Quarter, Year), the report displays a metric for the number of files delivered by each region. When a region is selected, the report displays a metric for the number of files delivered for each region. When a region is selected, the report displays a transaction volume by Authorized User and then by file format. Additional charts can be selected to illustrate one or more metrics, including one or more of: Total File Count, Average File Count, Maximum File Count, Cumulative Growth %. The display may be selected to display a desired metric from any of the above listed dimensions. For example, a file format may include invoices and the report will display a volume of invoices by invoice provider, region and then time. Other types of graphs or graphical user interfaces may be implemented as well.

In an embodiment, the monitoring system 200 generates and provides a report of file through put processing time. The through put processing time includes time from receipt of a data file to data endpoint. The through put processing is measured based on different end points for data being processed. For example the end point for a first type of data received might be a file delivery while the endpoint for a second type of data received is a data load into a reporting application. The processing through put includes an average processing time for one or more of the following processing stages:

Input file loading and validation time (Absolute and average time per 1000 records or a similar unit)

Matching and other enrichment process time (Absolute and average time per 1000 records or a similar unit)

File Extract time for delivery (Absolute and average time per 1000 records or a similar unit)

Data loading time into IS/IS Select/1099 or Socio economic (depending on where the data is sent for reporting service) (Absolute and average time per 1000 records or a similar unit)

In an embodiment, the file through put processing report includes one or more dimension levels including: Time Frame (Month, Quarter, Year, etc.), Region, Authorized User and File Format. From each dimension, a next level of dimension listed above can be selected. In an embodiment, file types may be selected as a basis for generating the report. For example, a selection of file types may include all files, financial files, invoice files, account files, organization files, hierarchy files and other files. Alternative and additional views and dimensions may be implemented as well.

When a file type and time frame are selected, a regional summary view will display one or more regions and a processing throughput time for the selected file type during the time frame. Additional charts can be selected to illustrate one or more other metrics, such as Average Processing Throughput time, Maximum Processing Throughput time, and Total Processing Throughput time. The desired metric may be selected and displayed on the File Processing Throughput report at any of the various dimension levels or views.

Figure 11:
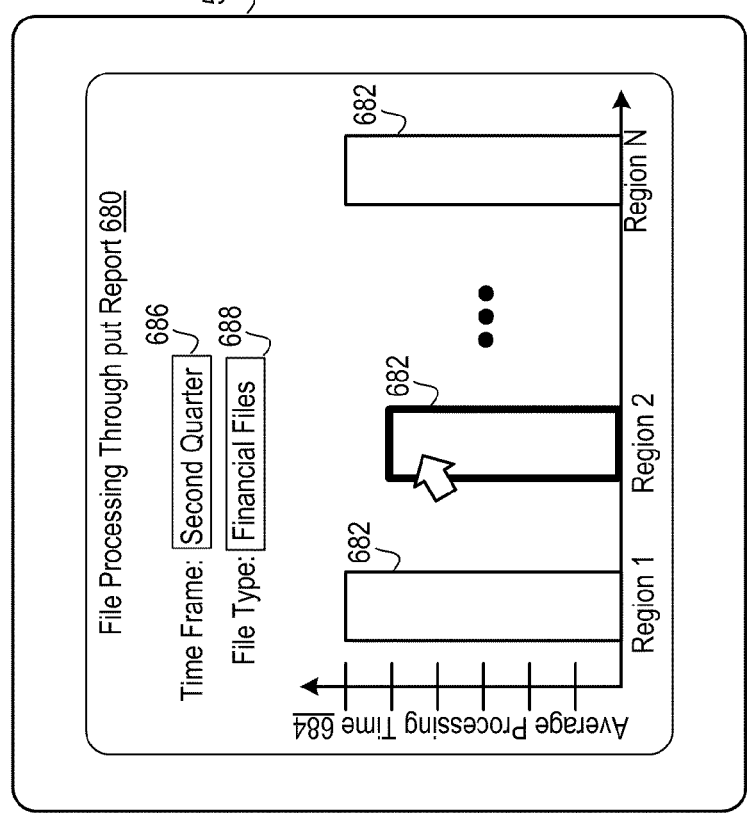
FIG. 11 is a schematic block diagram of an embodiment of a graphical user interface for displaying a file processing throughput report.

FIG. 11 illustrates an embodiment of a File Processing Throughput report 680. In the example of FIG. 11, a regional summary view displays one or more regions and an average processing throughput time 684 for a selected file type 688 and time frame 686. When a region is selected, an average processing throughput for a data file is displayed. Other levels or order of drill down levels may be provided as well. In an embodiment, the File Processing Throughput report 680 for a selected data file includes one or more of the following fields in Table 1.

TABLE 1

Fields for a File Processing Throughput Report 680

| Field | Report field name | Notes |
|---|---|---|
| 1 | Region | |
| 2 | Processor name | Processor defined for the member bank. |
| 3 | Member Bank Name | If the file is being received from processor, then include data for all the individual member banks in the report as individual rows. If the file is being processed as one unit, then leave this field blank. |

TABLE 1-continued

Fields for a File Processing Throughput Report 680

| Field | Report field name | Notes |
|---|---|---|
| 4 | File Format | Unique identifier for the file |
| 5 | Actual File Name | Name of the actually received file |
| 6 | Date | Date of data. If the month is not complete as of last complete GMT day, then data should be captured till that day. |
| 7 | Flow Type | Data from a particular inbound file/end-point might be split and go to multiple destinations depending upon subscription. This report should be generated on 2 broad categories of data delivery/or loading.<br>Flow Type can only have 2 values:<br>Data Delivery: to display statistics for data going to an external end-point for a particular inbound file.<br>Reporting Services: to display statistics for data going to any (or multiple) VIM reporting applications for this particular inbound file. |
| 8 | Outbound Destination | Name of the outbound destination |
| 9 | Outbound File | Name of the actual outbound file |
| 10 | Received Time | Time when the inbound file was first received by IMS 100 or card processing system 10 |
| 11 | Completed Time | Data Delivery: Time when the outbound file was sent from data from this particular inbound file.<br>Reporting Services: Time when the last data is loaded into VIM reporting applications for this particular inbound file. |
| 12 | Processing Time | Difference between "Completed Time" and "Received Time" in hr./minutes. The start and end processing time for each processing stage may be displayed. |
| 13 | Number of records Processed | Total number of records processed for either 1) outbound files in the case of "Data Delivery" or 2) loaded into reporting application in the case of "Reporting Services". |
| 14 | Average Processing time (last 30 days) | Moving average of the processing time calculated for last 30 days. |

The fields in Table 1 may be displayed in one more separate graphs, charts, documents, tables or other graphical user interfaces in the File Processing Throughput Report 680.

In an embodiment, the file monitoring system 200 generates and provides a report of through put processing time with aggregation data. The aggregation is performed on data flow type, region, processor, file end-point and time frame (weekly, monthly, yearly). The processing time includes a sum of processing time values for an authorized user, data flow type and inbound file aggregated for selected time period up to current date. An average processing time is calculated for last selected time period, e.g. 30 days for monthly selected time period, on aggregated values.

Figure 12A:
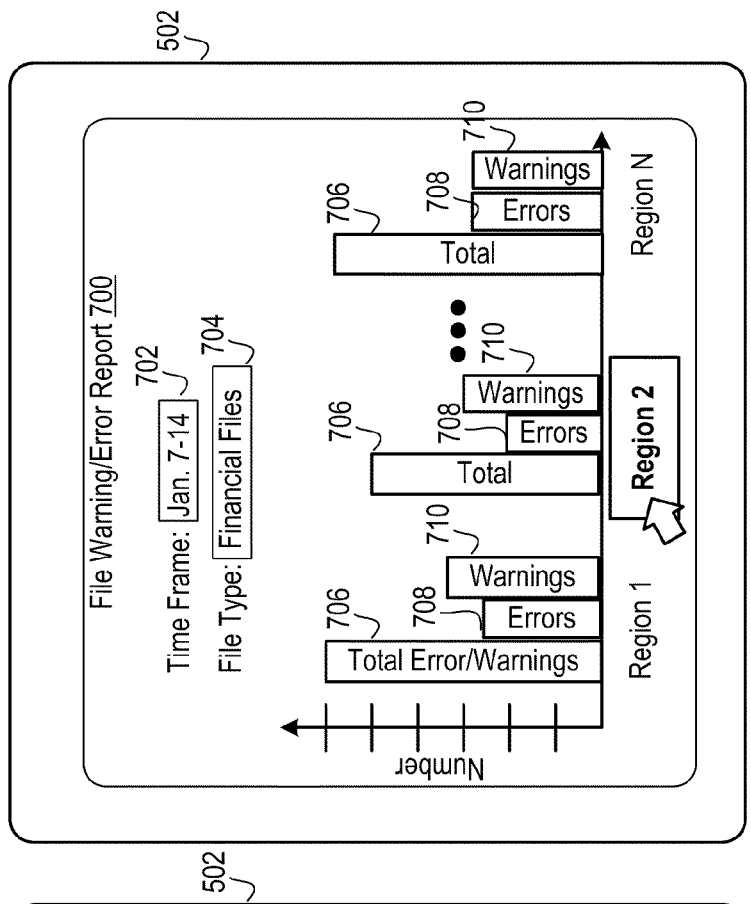

In an embodiment, the file monitoring system 200 generates and provides a report on File Processing Warning and Error Statistics. This report displays a total number of processing warning and error counts from the processing stages. In an embodiment, the File Processing Warning/Error Statistics report includes one or more dimension levels including: Time (Month, Week, Day), Region, Authorized User, File Definition or type, Type of Error or Warning and Warning or Error Description. FIG. 12*a* illustrates a regional summary view of the File Processing Warning and Error Statistics report 700. It includes one or more regions and a total warning/error count 706 for a selected time frame 702 and file type 704. It may also include the count of errors 708 and count of warnings 710 in the total error/warnings count 706 for each region. FIG. 12*b* illustrates a view for a selected region of the File Processing Warning and Error Statistics report 700. The report includes a total count of warnings 720, maximum warnings for a processing stage 722, minimum warnings for a processing stage 724, average warnings for the processing stages 726. The report similarly shows for errors, a total count of errors 728, maximum errors for a processing stage 730, minimum warnings for a processing stage 732, average warnings for the processing stages 734. Alternative and additional metrics and parameters may also be displayed.

At a detail level, the File Processing Warning and Error Statistics report 700 displays a Warning/Error description, date and time of the occurrence of the warning/error, region, authorized user, type of error, whether the record was rejected by the system and other available information. The file monitoring system 200 may determine the warning/error count information from status updates and from any warning and error logs managed by IMS 100 and card processing system 10. By displaying the errors and warnings by type, file definition, region, and other parameters, patterns of warnings or errors can more easily be identified.

As described herein, the file monitoring system 200 provides a graphical user interface (GUI) to view status reports 416 of processing of data files. Various applications and systems transmit status updates at one or more stages of processing to the file monitoring system 200. The file monitoring system 200 monitors the status updates and generates reports displaying the status of the data files. Reports include end to end status, files received and files delivered.

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may still further be used herein, the term "associated with", includes direct and/or indirect association of separate data and/or one data being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A method, comprising:
    receiving a first status update with an associated tracking number for a data file, wherein the first status update includes a time of receipt of the data file by a data processing system, wherein a plurality of predetermined processing stages in the data processing system corresponds to processing of data from the data file, and wherein the predetermined processing stages include a stage for processing of the data file by a transaction processing entity;
    identifying a type of data file based on the tracking number, wherein a number of the predetermined processing stages varies depending on the type of data file;
    determining whether the data file is an expected data file based on the tracking number and the time of receipt for the data file, and further based on a list of expected data files and a predetermined time frame for receiving the expected data files;
    receiving one or more additional status updates from the predetermined processing stages; and
    generating a status report with a status of the data file for the predetermined processing stages based on the one or more additional status updates.

2. The method of claim 1, wherein the list of expected data files corresponds to an authorized user, the method further comprising:
    accessing a database comprising the list of expected data files; and
    generating a files expected and received report with expected data files and received data files for the authorized user.

3. The method of claim 2, further comprising:
    receiving another status update when a file is delivered to the authorized user;
    accessing a database with a list of expected data files to be delivered to the authorized user; and
    creating a files delivered report with expected data files to be delivered and data files delivered for the authorized user.

4. The method of claim 3, further comprising:
    determining a volume of data files received by the data processing system in response to the first status update; and
    generating a volume of files received report with the volume of data files received and processed by the data processing system, wherein the volume of files received report includes a number of files processed by region and file type.

5. The method of claim 4, further comprising:
    determining a file processing throughput in response to the one or more additional status updates; and
    generating a file processing throughput report.

6. The method of claim 5, wherein the file processing throughput is determined from a start processing time and end processing time included in the one or more additional status updates.

7. The method of claim 6, further comprising:
    determining a number of processing warnings and errors in response to the one or more additional status updates; and
    generating a file warning and error report, wherein the file warning and error report includes a number of errors and warnings by file type and processing stage.

8. The method of claim 1, wherein the data file includes new card account information, and wherein an output from completion of processing in the predetermined processing stages is creation of a new card account.

9. A system, comprising:
    an input/output (I/O) system operable to receive a plurality of status updates for one or more data files from predetermined processing stages in a data processing system, wherein the predetermined processing stages include a stage for processing of the data files by a transaction processing entity, wherein each of the plurality of status updates includes a tracking number to identify a data file and a processing status of the data file in one of the predetermined processing stages, and wherein each of the plurality of status updates further includes a receipt time for the data file;
    a database operable to store a list of expected data files and a predetermined time frame for receiving the expected data files from an authorized user, and further operable to store status information from the plurality of status updates; and
    a processing device operable to:
        generate a status report with the respective processing status of the one or more data files;
        determine whether the one or more data files are expected data files from the authorized user for the predetermined time frame based on the list of expected data files in the database, and further based on the respective tracking number and the respective receipt time for each of the one or more data files, and
        identify a type of data file based on the tracking number of the data file, wherein a number of the predetermined processing stages varies depending on the type of data file.

10. The system of claim 9, wherein the processing device is further operable to generate a files expected and received report.

11. The system of claim 10, wherein the processing device is further operable to:
    determine a file processing throughput in response to the plurality of status updates, wherein the file processing throughput is determined from a start processing time and end processing time included in one or more of the plurality of status updates; . and generate a file processing throughput report.

12. The system of claim 11, wherein the processing device is further operable to:

determine a number of processing warnings and errors in response to the plurality of status updates; and generate a file warning and error report, wherein the file warning and error report includes a number of errors and warnings by file type and by one or more of the predetermined processing stages.

13. A system, comprising:

one or more processing devices configured to implement at least one of a plurality of data processing stages for processing data files, wherein each of the data processing stages is to generate at least one status update for a data file with a tracking number and a status of the data file in the data processing stage, and wherein the data processing stages include a stage for processing of the data files by a transaction processing entity;

a database that includes a list of expected data files and a predetermined time frame for receiving the expected data files from an authorized user; and a file monitoring system, comprising at least one processing device, operable to:

receive the at least one status update from each of the data processing stages and to generate a status report;

determine whether the data file is an expected data file from the authorized user for the predetermined time frame based on the tracking number and a time of receipt for the data file, and further based on the list of expected data files in the database; and identify a type of data file based on the tracking number of the data file, wherein a number of the data processing stages corresponds to the type of data file.

14. The system of claim 13, wherein the file monitoring system is further operable to generate a files expected and received report.

* * * * *